US012356987B2

(12) United States Patent
Kida et al.

(10) Patent No.: US 12,356,987 B2
(45) Date of Patent: Jul. 15, 2025

(54) INSECTICIDAL COMPOSITION AND METHOD OF CONTROLLING HARMFUL ORGANISM

(71) Applicant: Mitsui Chemicals Crop & Life Solutions, Inc., Tokyo (JP)

(72) Inventors: Jotaro Kida, Moriyama (JP); Mika Higuchi, Hikone (JP); Niiha Sasakura, Yasu (JP); Shuji Ishizaki, Kawasaki (JP); Takashi Obayashi, Moriyama (JP)

(73) Assignee: MITSUI CHEMICALS CROP & LIFE SOLUTIONS, INC., Tokyo (JP)

( * ) Notice: Subject to any disclaimer, the term of this patent is extended or adjusted under 35 U.S.C. 154(b) by 874 days.

(21) Appl. No.: 17/291,815

(22) PCT Filed: Nov. 13, 2019

(86) PCT No.: PCT/JP2019/044564
§ 371 (c)(1),
(2) Date: May 6, 2021

(87) PCT Pub. No.: WO2020/100948
PCT Pub. Date: May 22, 2020

(65) Prior Publication Data
US 2021/0386062 A1 Dec. 16, 2021

(30) Foreign Application Priority Data

Nov. 14, 2018 (JP) ................................. 2018-214095

(51) Int. Cl.
*A01N 37/46* (2006.01)
*A01N 25/04* (2006.01)
*A01N 25/30* (2006.01)

(52) U.S. Cl.
CPC ............ *A01N 37/46* (2013.01); *A01N 25/04* (2013.01); *A01N 25/30* (2013.01)

(58) Field of Classification Search
None
See application file for complete search history.

(56) References Cited

U.S. PATENT DOCUMENTS

| 8,236,830 B2 | 8/2012 | Van et al. |
| 8,969,392 B2 | 3/2015 | Van Den Eynde et al. |
| 9,485,987 B2 | 11/2016 | Sato et al. |
| 2010/0035844 A1 | 2/2010 | Van et al. |
| 2010/0317700 A1 | 12/2010 | Morita et al. |
| 2012/0270843 A1 | 10/2012 | Van Den Eynde et al. |
| 2013/0131083 A1* | 5/2013 | Ikari ............... A01N 43/56 514/378 |
| 2015/0223449 A1 | 8/2015 | Kawada |
| 2015/0351384 A1 | 12/2015 | Sato et al. |
| 2017/0006870 A1 | 1/2017 | Arai et al. |
| 2018/0220644 A1 | 8/2018 | Krapp et al. |
| 2019/0230926 A1 | 8/2019 | Reinhard et al. |

FOREIGN PATENT DOCUMENTS

| JP | 2010001268 A | 1/2010 | |
| JP | 2010-150227 A | 7/2010 | |
| JP | 2011148756 A | 8/2011 | |
| JP | 2011157294 A | 8/2011 | |
| JP | 2014-043431 A | 3/2014 | |
| JP | 2014208668 A | 11/2014 | |
| JP | 2017-075144 A | 4/2017 | |
| JP | 2018-525387 A | 9/2018 | |
| KR | 10-2010-0124760 A | 11/2010 | |
| KR | 10-2016-0126038 A | 11/2016 | |
| WO | WO-2010018714 A1 * | 2/2010 | ............ A01N 37/18 |
| WO | 2014119620 A1 | 8/2014 | |
| WO | 2018011056 A1 | 1/2018 | |

OTHER PUBLICATIONS

Office Action (Request for the Submission of an Opinion) issued Jul. 12, 2023, by the Korean Intellectual Property Office in corresponding Korean Patent Application No. 10-2021-7014138 and an English translation of the Office Action. (13 pages).
International Search Report (PCT/ISA/210) with an English translation, and Written Opinion (PCT/ISA/237) mailed on Jan. 7, 2020, by the Japan Patent Office as the International Searching Authority for International Application No. PCT/JP2019/044564. (9 pages).
Dimroth and Reichardt ET, Search on Jul. 22, Reiwa 4(2022), the Internet, <URL; http://www.stenutz.eu/chem/solv20.php>, (11 pages) 'Cited in Office Action issued Aug. 2, 2022, in corresponding Japanese Patent Application No. 2018-214095).
Y. E. I, Table of Permitivity, Search on Jul. 22, Reiwa 4(2022), the Internet <URL; http://www.yei-jp.com/tech> infor/dielectric/dielectric. html, with English translation, (5 pages) (Cited in Office Action issued Aug. 2, 2022, in corresponding Japanese Patent Application No. 2018-214095).

* cited by examiner

*Primary Examiner* — Nannette Holloman
(74) *Attorney, Agent, or Firm* — BUCHANAN INGERSOLL & ROONEY PC

(57) ABSTRACT

An insecticidal composition of the present invention includes (1) a diamide-based insecticidal active ingredient; (2) a solvent having 5 or more of a relative dielectric constant ($\varepsilon_r$) and 38 kcal/mol or more of a transition energy ($\varepsilon_T$ (30)); (3) a nonionic surfactant; and (4) a nonpolar solvent that is contained in an amount less than 30% by weight with respect to a total amount of the composition.

9 Claims, No Drawings

INSECTICIDAL COMPOSITION AND METHOD OF CONTROLLING HARMFUL ORGANISM

TECHNICAL FIELD

The present invention relates to an insecticidal composition containing a diamide-based insecticidal active ingredient and having an excellent harmful organism control effect, and a method of controlling a harmful organism.

BACKGROUND ART

The diamide-based insecticidal active ingredient is known as an excellent insecticidal active ingredient that is effective for controlling harmful pests such as Lepidoptera, Hemiptera, Diptera, and Coleoptera, and has high selectivity between the harmful pests and non-target organisms such as mammals and natural enemy pests (Patent Document 1).

An agrochemical composition is roughly classified in a dosage form such as powder, a granule, wettable powder, a water dispersible granule, water soluble powder, a water soluble granule, an emulsion, a liquid, an oil, a flowable formulation, an emulsion formulation, a fine granule, a tablet, and a jumbo formulation. Among these dosage forms, the emulsion is the oldest type of a formulation, and is basically composed of an agrochemical active ingredient, an organic solvent, and a surfactant. Since the emulsion can be prepared simply by mixing and dissolving raw materials, and has various advantages such as excellent harmful organism control effect and low price, it is one of the commonly used formulations even now.

However, the use or storage of the emulsion in cold climates needs to be considered, and in a case where the emulsion is stored at a low temperature, the solvent sufficiently dissolving an agrochemical active ingredient is to be used in order to prevent a separation of an oily substance or a precipitation of a solid substance. In the related art, a nonpolar solvent such as aromatic hydrocarbon (xylene or the like) is often used, but can dissolve only the agrochemical active ingredient with a low polarity. In addition, using the aromatic hydrocarbon has problems of, for example, inhalation toxicity, a risk of fire, or an anxiety about air pollution.

On the other hand, many diamide-based insecticidal active ingredients are hardly soluble in a nonpolar solvent. The diamide-based insecticidal active ingredient is dissolved relatively well in a highly polar solvent, but in a case where a solution of the formulation dissolved in such solvent is diluted with water, such solvent is dissolved in water (or water is dissolved in such solvent) in the diluted solution, thereby, precipitation of crystals of the active ingredient due to a decrease in solubility thereof, and deterioration in the harmful organism control effect are observed for a while.

For example, Patent Document 1 describes the emulsion using broflanilide that is a diamide-based insecticidal active ingredient, dimethylsulfoxide, Sorpol, and xylene, but not describes about a harmful organism control effect.

Patent Document 2 discloses the agrochemical emulsion composition that is excellent in emulsifying property even if an agrochemical active ingredient has low solubility in water and xylene and does not contain substantially an aromatic hydrocarbon-based organic solvent and a phenyl ether-based surfactant. Here, the polar solvent used in the Patent Document 2 is limited to N-alkylpyrrolidone such as N-methyl-2-pyrrolidone, and the Patent Document 2 does not describe a harmful organism control effect.

RELATED DOCUMENT

Patent Document

[Patent Document 1] JP2011-157294
[Patent Document 2] JP2010-001268

SUMMARY OF THE INVENTION

Technical Problem

An object of the present invention is to provide an insecticidal composition containing a diamide-based insecticidal active ingredient and having an excellent harmful organism control effect.

Solution to Problem

As a result of intensive studies, the present inventors have found that an insecticidal composition having an improved harmful organism control effect, an excellent emulsifying property in a case of being diluted with water, and an excellent preservation stability, is obtained by dissolving an insecticidal active ingredient in a solvent having a specific range of a relative dielectric constant and transition energy and combining a nonionic surfactant therewith.

That is, the present invention is as follows from [1] to [9].

[1] An insecticidal composition including (1) a diamide-based insecticidal active ingredient,
(2) a solvent having 5 or more of a relative dielectric constant ($\varepsilon_r$) and 38 kcal/mol or more of a transition energy ($\varepsilon_T(30)$),
(3) a nonionic surfactant, and
(4) a nonpolar solvent that is contained in an amount less than 30% by weight with respect to a total amount of the composition.

[2] The composition according to [1], in which (2) the solvent has 5 to 78 of the relative dielectric constant ($\varepsilon_r$), and 38 to 52 kcal/mol of the transition energy ($\varepsilon_T(30)$).

[3] The composition according to [1] or [2], in which (1) the diamide-based insecticidal active ingredient is broflanilide.

[4] The composition according to any one of [1] to [3], in which (2) the solvent is one or more selected from the group consisting of 1,3-dimethyl-2-imidazolidinone, N,N'-dimethylpropylene urea, N-methylpyrrolidone, N,N-dimethylformamide, dimethylsulfoxide, 3-methoxy-N,N-dimethylpropanamide, N-butylpyrrolidone, cyclohexanone, 3-butoxy-N,N-dimethylpropanamide, methyl 5-(dimethylamino)-2-methyl-5-oxopentanoate, N,N-dimethyloctanamide, lactic acid dimethylamide, N,N-dimethyldecanamide, γ-butyrolactone, 3-methyl-2-oxazodone, ethylene glycol monomethyl ether, and benzyl alcohol.

[5] The composition according to anyone of [1] to [4], in which (3) the nonionic surfactant is a phenyl ether-based surfactant.

[6] The composition according to [5], in which the phenyl ether-based surfactant is a formalin condensate of polyoxyalkylene (mono, di, or tri) styrylphenyl ether.

[7] The composition according to anyone of [1] to [6], in which a content of (1) the diamide-based insecticidal active ingredient is 0.1% to 30% by weight with respect to the total amount of the composition.

[8] The composition according to anyone of [1] to [7], in which the composition is in a liquid state.

[9] A method of controlling a harmful organism, including applying the insecticidal composition according to any one of [1] to [8] to a plant, a soil, or a water surface.

Advantageous Effects of Invention

According to the present invention, an insecticidal composition having an excellent harmful organism control effect can be obtained by dissolving a diamide-based insecticidal active ingredient in a solvent, which is a main solvent, having a specified relative dielectric constant and transition energy, and a nonpolar solvent used as necessary, and combining a nonionic surfactant therewith. The composition has also an excellent preservation stability and excellent emulsification stability, and has also little anxiety about inhalation toxicity, a risk of fire, and air pollution because it does not contain the nonpolar solvent such as aromatic hydrocarbon (xylene or the like) as a main solvent.

DESCRIPTION OF EMBODIMENTS

Hereinafter, various terms used in the present specification will be described.

Examples of (1) a diamide-based insecticidal active ingredient in the present invention include flubendiamide, chlorantraniliprole, cyantraniliprole, cyclaniliprole, tetraniliprole, broflanilide, cyhalodiamide, and tetrachlorantraniliprole. Among them, broflanilide is particularly preferable. As (1) the diamide-based insecticidal active ingredient, at least one selected from these compounds can be used.

As the insecticidal active ingredient used in the present invention, (1) the diamide-based insecticidal active ingredient may be singly used or may be used in combination with other insecticidal active ingredients or fungicidal active ingredients. The insecticidal composition of the present invention that contains a fungicidal active ingredient can also be effective in diseases.

Examples of other insecticidal active ingredients include phosphocarb, alanycarb, butocarboxim, butoxycarboxim, thiodicarb, thiofanox, aldicarb, bendiocarb, benfuracarb, carbaryl, carbofuran, carbosulfan, ethiofencarb, fenobucarb, formetanate, furathiocarb, isoprocarb, methiocarb, methomyl, oxamyl, pirimicarb, propoxur, trimethacarb, XMC, allyxycarb, aldoxycarb, bufencarb, butacarb, carbanolate, metolcarb, xylylcarb, fenothiocarb, xylylcarb, bendiocarb, acephate, azamethiphos, azinphos-methyl, azinphos-ethyl, ethephon, cadusafos, chlorethoxyfos, chlorfenvinfos, chlormephos, chlorpyrifos, chlorpyrifos-methyl, coumaphos, cyanophos, demeton-S-methyl, diazinon, dichlofenthion, dichlorvos, dicrotophos, dimethoate, dimethylvinphos, disulfoton, O-ethyl O-(4-nitrophenyl) phenylphosphonothioate, ethion, ethoprophos, famphur, fenamiphos, fenitrothion, fenthion, fosthiazate, heptenophos, isofenphos-methyl, isocarbophos, isoxathion, malathion, mecarbam, methamidophos, methidathion, mevinphos, monocrotophos, naled, omethoate, oxidemetonmethyl, parathion, parathion-methyl, phenthoate, phorate, phosalone, phosmet, phosphamidon, phoxim, pirimiphosmethyl, profenofos, propetamphos, prothiofos, pyraclofos, pyridaphenthion, quinalphos, sulfotep, tebupirimfos, temephos, terbufos, thiometon, triazophos, trichlorfon, vamidothion, chlorthion, bromfenvinphos, bromophos, bromophosethyl, butathiofos, carbophenothion, chlorphoxim, sulprofos, diamidaphos, tetrachlorvinphos, propaphos, mesulfenfos, dioxabenzofos, etrimfos, oxydeprofos, formothion, fensulfothion, isazophos, imicyafos, isamidofos, thionazin, fosthietan, chlordane, endosulfan, lindane, dienochlor, ethiprole, fipronil, acetoprole, acrinathrin, allethrin [(1R)-isomer], bifenthrin, bioallethrin (bioallethrin S-cyclopentenyl isomer), bioresmethrin, cycloprothrin, cyfluthrin, beta-cyfluthrin, cyhalothrin, gamma-cyhalothrin, lambda-cyhalothrin, cypermethrin, alpha-cypermethrin, beta-cypermethrin, theta cypermethrin, zeta-cypermethrin, cyphenothrin [(1R)-trans-isomer], deltamethrin, empenthrin [(EZ)-(1R)-isomer], esfenvalerate, etofenprox, fenpropathrin, fenvalerate, flucythrinate, flumethrin, tau-fluvalinate, halfenprox, imiprothrin, methothrin, metofluthrin, epsilon-metofluthrin, momfluorothrin, epsilon-momfluorothrin, permethrin, phenothrin [(1R)-trans-isomer], prallethrin, resmethrin, kadethrin, silafluofen, tefluthrin, tetramethrin, tetramethrin [(1R)-isomer], tralomethrin, transfluthrin, ZXI 8901, biopermethrin, furamethrin, profluthrin, flubrocythrinate, dimefluthrin, DDT, methoxychlor, phenothrin, fluvalinate, acetamiprid, clothianidin, dinotefuran, imidacloprid, nitenpyram, thiacloprid, thiamethoxam, nicotine, nicotine sulfate, sulfoxaflor, flupyradifurone, triflumezopyrim, spinosad, spinetoram, abamectin, emamectin benzoate, lepimectin, milbemectin, hydroprene, kinoprene, methoprene, fenoxycarb, pyriproxyfen, methyl bromide, chloropicrin, cryolite, sulfuryl fluoride, borax, boric acid, disodium octaborate, sodium metaborate, tartar emetic, dazomet, metam, metam sodium, pymetrozine, pyrifluquinazon, clofentezine, diflovidazin, hexythiazox, etoxazole, diafenthiuron, azocyclotin, cyhexatin, fenbutatin oxide, propargite, tetradifon, chlorfenapyr, DNOC, binapacryl, sulfluramid, bensultap, cartap hydrochloride, thiocyclam, monosultap, bistrifluron, chlorfluazuron, diflubenzuron, flucycloxuron, flufenoxuron, hexaflumuron, lufenuron, novaluron, noviflumuron, teflubenzuron, triflumuron, buprofezin, cyromazine, chromafenozide, halofenozide, methoxyfenozide, tebufenozide, amitraz, hydramethylnon, acequinocyl, fluacrypyrim, bifenazate, fenazaquin, fenpyroximate, pyridaben, pyrimidifen, tebufenpyrad, tolfenpyrad, rotenone, indoxacarb, metaflumizone, spirodiclofen, spiromesifen, spirotetramat, aluminum phosphide, calcium phosphide, hydrogen phosphide, zinc phosphide, calcium cyanide, sodium cyanide, potassium cyanide, cyenopyrafen, cyflumetofen, pyflubumide, flonicamid, azadirachtin, benzoximate, phenisobromolate, quinomethionate, dicofol, pyridalyl, bromopropylate, triazamate, dicyclanil, dinobuton, dinocap, hydrogen cyanide, methyl iodide, karanjin, mercury chloride, methyl isothiocyanate, pentachlorophenol, phosphine, piperonyl butoxide, polynactin complex, sabadilla, sulcofuron salt (sulcofuron-sodium), tribufos, aldrin, amidithion, amidothioate, aminocarb, amiton, aramite, athidathion, azothoate, barium polysulfide, benclothiaz, 5-(1,3-benzodioxol-5-yl)-3-hexylcyclohex-2-enone, 1,1-bis(4-chlorophenyl)-2-ethoxyethanol, butonate, butopyronoxyl, 2-(2-butoxyethoxy)ethyl thiocyanate, camphechlor, chlorbenside, chlordecone, chlordimeform, chlorfenethol, chlorofenson, fluazuron, metaldehyde, bialaphos, levamisole hydrochloride, amidoflumet, pyrafluprole, pyriprole, tralopyril, flupyrazofos, diofenolan, chlorbenzilate, flufenzine, benzomate, flufenerim, albendazole, oxybendazole, fenbendazole, metam sodium, 1,3-dichloropropene, flometoquin, dicloromezotiaz, ethylene dibromide, acrylonitrile, bis(2-chloroethyl) ether, 1-bromo-2-chloroethane, 3-bromo-1-chloroprop-1-ene, bromocyclen, carbon disulfide, carbon tetrachloride, nemadectin, cymiazole, calcium polysulfide, cytokinin, 2-(octylthio) ethanol, potassium oleate, sodium oleate, petroleum oil, tar oil, anabasine, morantel tartrate, pyrethrum (pyrethrin), rapeseed oil, soy lecithin, starch, hydroxypropyl starch, fatty acid glyceride, propylene glycol monofatty acid ester, diatomaceous earth, afoxolaner, fluazaindolizine, afidopyropen, tioxazafen, fluhexafon, fluralaner, fluxametamide, sarolaner, lotilaner, cycloxaprid, fluensulfone, TPIC, D-D, peroxocarbonate, MB-599, bis(2,3,3,3-tetrachloropropyl) ether, DCIP, ENT-8184, Bayer 22408, Bayer 32394, BAI-1602, BAI-1603, S-1587, chloroprallethrin, benzpyrimoxan, acynonapyr, spiropidion, flupyrimin, and tyclopyrazoflor. As other insecticidal active ingredients, at least one selected from these compounds can be used.

Examples of the fungicidal active ingredient include benalaxyl, benalaxyl M or kiralaxyl, oxadixyl, furalaxyl, metalaxyl, metalaxyl M or mefenoxam, ofurace, benomyl, carbendazim, fuberidazole, thiabendazole, thiophanate, thiophanate methyl, diethofencarb, zoxamide, ethaboxam, pencycuron, fluopicolide, phenamacril, benodanil, benzovindiflupyr, bixafen, boscalid, carboxin, fenfuram, fluopyram, flutolanil, fluxapyroxad, furametpyr, isofetamid, isopyrazam, mepronil, oxycarboxin, penthiopyrad, penflufen, pydiflumetofen, sedaxane, thifluzamide, pyraziflumid, azoxystrobin, coumoxystrobin, dimoxystrobin, enoxastrobin, famoxadone, fenamidone, fenaminstrobin, flufenoxystrobin, fluoxastrobin, kresoxim-methyl, mandestrobin, metominostrobin, orysastrobin, picoxystrobin, pyraclostrobin, pyrametostrobin, pyraoxystrobin, pyribencarb, triclopyricarb, trifloxystrobin, cyazofamid, amisulbrom, binapacryl, meptyldinocap, dinocap, fluazinam, ametoctradin, cyprodinil, mepanipyrim, pyrimethanil, streptomycin, blasticidin S, kasugamycin, oxytetracycline, fenpiclonil, fludioxonil, quinoxyfen, proquinazid, chlozolinate, dimethachlon, iprodione, procymidone, vinclozolin, edifenphos, iprobenfos, pyrazophos, isoprothiolane, biphenyl, chloroneb, dichloran, quintozene, tecnazene, tolclofos-methyl, etridiazol, iodocarb, propamocarb, prothiocarb, azaconazole, bitertanol, bromuconazole, cyproconazole, difenoconazole, diniconazole, diniconazole M, epoxyconazole, etaconazole, fenarimol, fenbuconazole, fluquinconazole, quinconazole, flusilazole, flutriafol, hexaconazole, imazalil, imibenconazole, ipconazole, metconazole, myclobutanil, nuarimol, oxpoconazole, oxpoconazole fumarate, pefurazoate, penconazole, prochloraz, propiconazole, prothioconazole, pyrifenox, pyrisoxazole, simeconazole, F-69, tebuconazole, tetraconazole, triadimefon, triadimenol, triflumizole, triforine, triticonazole, mefentrifluconazole, ipfentrifluconazole, aldimorph, dodemorph, fenpropimorph, tridemorph, fenpropidine, piperalin, spiroxamine, fenhexamid, fenpyrazamine, pyributicarb, naftifine, terbinafine, polyoxins, dimethomorph, flumorph, pyrimorph, benthiavalicarb, benthiavalicarb-isopropyl, iprovalicarb, mandipropamid, valifenalate, fthalide, pyroquilone, tricyclazole, carpropamide, diclocymet, fenoxanil, tolprocarb, acibenzolar S-methyl, probenazole, tiadinil, isotianil, laminarin, mancozeb or manzeb, maneb, metiram, propineb, thiuram, zineb, ziram, ferbam, captan, captafol, folpet, fluor-folpet, guazatine, iminoctadine, iminoctadine albesilate, iminoctadine triacetate, basic copper chloride, copper hydroxide, basic copper sulfate, an organic copper compound, a copper complex salt [II] of bisethylenediamine dodecylbenzene sulfonate, sulfur, fluoroimide, chlorothalonil, dichlofluanid, tolylfluanid, anilazine, dithianon, quinomethionate, extracts from cotyledons of *lupinus albus* seedlings (BLAD), dichlobentiazox, fenpicoxamid, dipymetitrone, bupirimate, dimethirimol, ethirimol, triphenyltin acetate, triphenyltin chloride, triphenyltin hydroxide, oxolinic acid, hymexazol, octhilinone, fosetyl, phosphorous acid, sodium phosphite, ammonium phosphite, potassium phosphite, tecloftalam, triazoxide, flusulfamide, diclomezine, silthiofam, diflumrtorim, methasulfocarb, cyflufenamid, metrafenone, pyriofenone, dodine, flutianil, ferimzone, oxathiapiprolin, tebufloquin, picarbutrazox, validamycins, cymoxanil, quinofumelin, NC-241, NF-180, S-2190, S-2367, inpyrfluxam, fluindapyr, isoflucypram, and aminopyrifen. As the fungicidal active ingredient, at least one selected from these compounds can be used.

The blending amount of (1) the diamide-based insecticidal ingredient varies depending on the kind thereof, but it is usually 0.1% to 30% by weight, preferably 1% to 25% by weight, and more preferably 1% to 20% by weight, with respect to 100% by weight of the insecticidal composition of the present invention.

(2) The solvent used in the present invention has preferably 5 or more of a relative dielectric constant ($\varepsilon_r$) and 38 kcal/mol or more of transition energy ($\varepsilon_T(30)$), and more preferably 5 to 78 of the relative dielectric constant ($\varepsilon_r$) and 38 to 52 kcal/mol of the transition energy ($\varepsilon_T(30)$).

Examples of the solvent corresponding to conditions above include 1,3-dimethyl-2-imidazolidinone, N,N'-dimethylpropylene urea, N-methylpyrrolidone, N-butylpyrrolidone, N,N-dimethylformamide, dimethylsulfoxide, 3-methoxy-N,N-dimethylpropanamide, cyclohexanone, 3-butoxy-N,N-dimethylpropanamide, methyl 5-(dimethylamino)-2-methyl-5-oxopentanoate, N,N-dimethyloctanamide, N,N-dimethyldecanamide, lactic acid dimethylamide, γ-butyrolactone, 3-methyl-2-oxazodone, ethylene glycol monomethyl ether, 2-heptanone, acetophenone, 3-methyl-3-methoxy-1-butanol, alkyl(C2 to C8) lactate, ethanol, 1-propanol, 2-propanol, and benzyl alcohol.

Among them, such solvent is suitably 1,3-dimethyl-2-imidazolidinone, N,N'-dimethylpropylene urea, N-methylpyrrolidone, N-butylpyrrolidone, N,N-dimethylformamide, dimethylsulfoxide, 3-methoxy-N,N-dimethylpropanamide, cyclohexanone, 3-butoxy-N,N-dimethylpropanamide, methyl 5-(dimethylamino)-2-methyl-5-oxopentanoate, N,N-dimethyloctanamide, N,N-dimethyldecanamide, lactic acid dimethylamide, γ-butyrolactone, 3-methyl-2-oxazodone, ethylene glycol monomethyl ether, or benzyl alcohol, and particularly preferably N-butylpyrrolidone, 3-methyl-2-oxazodone, or methyl 5-(dimethylamino)-2-methyl-5-oxopentanoate.

One of these solvents may be singly used, or two or more of these solvents may be used in combination.

The blending amount of (2) the solvent varies depending on the kind of the insecticidal ingredient, but it is usually 20% to 99.8% by weight, preferably 50% to 98% by weight, and more preferably 70% to 97% by weight, with respect to 100% by weight of the insecticidal composition of the present invention.

In the present invention, the relative dielectric constant ($\varepsilon_r$) is a measure of easiness of polarization of the molecule and easiness of dipole orientation and is a ratio of the dielectric constant of the solvent to the dielectric constant of vacuum, that is, $\varepsilon/\varepsilon_0=\varepsilon_r$. Specific measurement conditions will be described below.

Testing method: Automatic balance bridge method (LCR meter method)
Testing machine: LCR meter HP4284A (manufactured by Agilent Technologies)
Electrode: Liquid electrode cell type LE-22 (manufactured by Ando Electric Co., Ltd.)
Measurement frequency: 1 MHz
Measurement temperature: Atmospheric temperature (23±2° C.)

In the present invention, the transition energy ($E_T$ (30)) is one of the polarity parameters proposed by Dimroth and Reichardt, and is the parameter indicating the degree of polarity of a solvent evaluated by utilizing the phenomenon that charge-transfer (CT) absorption of pyridinium-N-phenoxide betaine shifts to the shorter wavelength side as the solvent polarity becomes larger (negative solvatochromism). Specific measurement conditions will be described below.

Testing machine: UV-visible spectrophotometer UV-1800 (manufactured by Shimadzu Corporation)

Dye: Reichardt's dye (manufactured by SIGMA-ALDRICH Co. LLC)

Measurement temperature: Atmospheric temperature (25±2° C.)

Measurement method: Absorption is measured with a spectrophotometer for various solvents in which the dye is dissolved, then $\lambda_{max}$ of the absorption is obtained.

The transition energy ($E_T$ (30)) is obtained by substituting $\lambda_{max}$ into the following calculation formula.

$$\varepsilon_T(30)\ (kcal/mol) = hcN_A\bar{v}_{max} = 28591/\lambda_{max}$$

Examples of (3) the nonionic surfactant in the present invention include polyoxyalkylene (mono or di) alkyl ether, polyoxyalkylene alkyl (mono or di) phenyl ether, polyoxyalkylene allylphenyl ether, polyoxyalkylene (mono, di, or tri) styrylphenyl ether, a formalin condensate (formaldehyde condensate) of polyoxyalkylene (mono, di, or tri) styrylphenyl ether, polyoxyethylene polyoxypropylene block copolymer, polyoxyalkylene fatty acid (mono or di) ester, sorbitan fatty acid ester, polyoxyalkylene sorbitan fatty acid ester, a castor oil alkylene oxide adduct, acetylene glycol, acetylene alcohol, an alkylene oxide adduct of acetylene glycol, an ethylene oxide adduct of acetylene alcohol, and alkyl glycoside.

Among them, the nonionic surfactant is suitably polyoxyethylene (mono or di) alkyl ether, polyoxyethylene alkyl (mono or di) phenyl ether, polyoxyalkylene allylphenyl ether, polyoxyethylene (mono, di, or tri) styrylphenyl ether, a formalin condensate (formaldehyde condensate) of polyoxyalkylene (mono, di, or tri) styrylphenyl ether or the like, more preferably a phenyl ether-based surfactant, and particularly preferably a formalin condensate (formaldehyde condensate) of polyoxyethylene (mono, di, or tri) styrylphenyl ether. As (3) the nonionic surfactant, at least one selected from these compounds can be used.

As the surfactant used in the present invention, (3) the nonionic surfactant may be singly used or may be used in combination with other surfactants.

Examples of the other surfactants include an anionic surfactant such as an alkylsulfate ester salt, an alkylbenzene sulfonate salt, a lignosulfonate salt, an alkyl sulfosuccinate salt, a dialkyl sulfosuccinate salt, a naphthalenesulfonate salt, an alkyl naphthalenesulfonate salt, a salt of a formalin condensate (formaldehyde condensate) of naphthalenesulfonic acid, a salt of a formalin condensate (formaldehyde condensate) of alkyl naphthalenesulfonic acid, a polyoxyalkylene alkyl ether (sulfuric or phosphoric) acid ester salt, a polyoxyalkylene (mono or di) alkyl phenyl ether (sulfuric or phosphoric) acid ester salt, a polyoxyalkylene (mono, di, or tri) styrylphenyl ether (sulfuric or phosphoric) acid ester salt, a polycarboxylate salt (for example, a polyacrylate salt, a polymaleate salt, and a copolymer of maleic acid and olefin), and a polystyrene sulfonate salt; a cationic surfactant such as an alkylamine salt and an alkyl quaternary ammonium salt; an amphoteric surfactant such as amino acid type and betaine type; a silicone-based surfactant; and a fluorine-based surfactant.

The blending amount of (3) the nonionic surfactant varies depending on the kind thereof, but it is usually 0.01% to 20% by weight, preferably 0.1% to 10% by weight, and more preferably 1% to 5% by weight, with respect to 100% by weight of the insecticidal composition of the present invention.

In the present invention, (4) the nonpolar solvent is a solvent having a relative dielectric constant ($\varepsilon_r$) less than 5.

Examples of the nonpolar solvent include an aromatic hydrocarbon such as xylene, alkyl (C9 to C13 and the like) benzene, phenylxylylethane, dimethylnaphthalene, alkyl (C1, C3 or C12 to C14, and the like) naphthalene, alkylbiphenyl, alkyldiphenyl alkane, and an aromatic hydrocarbon having a boiling point of 150° C. to 350° C., an aliphatic hydrocarbon such as petroleum oil, normal paraffin, isoparaffin and naphthene, and a mixture of the aromatic hydrocarbon and the aliphatic hydrocarbon such as kerosene. As (4) the nonpolar solvent, at least one selected from these compounds can be used.

The insecticidal composition of the present invention is excellent in the harmful organism control effect, the preservation stability, and the emulsification stability even in a case where the nonpolar solvent is not added (0% by weight), and has also little anxiety about inhalation toxicity, a risk of fire, and air pollution because it does not contain the nonpolar solvent such as aromatic hydrocarbon (xylene or the like) as a main solvent.

The blending amount of (4) the nonpolar solvent varies depending on the kind of the solvent, but it is usually less than 30% by weight, preferably 20% by weight or less, and more preferably 10% by weight or less, with respect to 100% by weight of the insecticidal composition of the present invention.

In addition, as necessary, an adjuvant such as a crystallization inhibitor or various stabilizers can be added to the insecticidal composition of the present invention.

The insecticidal composition of the present invention is excellent in the harmful organism control effect, the preservation stability, and the emulsification stability by containing (1) the diamide-based insecticidal active ingredient, (2) the solvent having 5 or more of a relative dielectric constant ($\varepsilon_r$) and 38 kcal/mol or more of transition energy ($E_T$ (30)), and (3) the nonionic surfactant, and has more excellent above effects and also little anxiety about inhalation toxicity, a risk of fire, and air pollution because it contains (4) the nonpolar solvent less than the predetermined amount.

From the viewpoint of the effect of the present invention, the insecticidal composition can contain the components (1) to (4) in the following amounts with respect to 100% by weight of the insecticidal composition, respectively.

(1) The diamide-based insecticidal active ingredient is contained in an amount 0.1% to 30% by weight, preferably 1% to 25% by weight, more preferably 1% to 20% by weight.

(2) The solvent is contained in an amount 20% to 99.8% by weight, preferably 50% to 98% by weight, more preferably 70% to 97% by weight.

(3) The nonionic surfactant is contained in an amount 0.01% to 20% by weight, preferably 0.1% to 10% by weight, more preferably 1% to 5% by weight.

(4) The nonpolar solvent is contained in an amount less than 30% by weight, preferably 20% by weight or less, and more preferably 10% by weight or less.

Furthermore, such contents can be appropriately combined.

Hereinafter, a method of preparing the insecticidal composition of the present invention will be described.

The method of preparing the insecticidal composition of the present invention is not particularly limited and, for example, the composition can be obtained in a liquid state by adding (1) the diamide-based insecticidal active ingredient, (3) the nonionic surfactant, and also the aforementioned adjuvant as necessary to (2) the solvent and then dissolving uniformly by stirring therein. (4) The nonpolar solvent can be also used with (2) the solvent. In a case where the velocity of dissolution of a solid active ingredient or the like is so slow as to make it difficult to be dissolved, as necessary, the velocity of dissolution can be accelerated by heating.

The insecticidal composition of the present invention is applied to a plant, a soil, or a water surface, and thereby, harmful organism can be controlled. The insecticidal composition can be applied as it is or can also be applied as a spraying liquid by being diluted with water. The insecticidal composition of the present invention contains the predetermined ingredients and has an excellent emulsifying property in a case of being diluted with water.

In a case where the insecticidal composition is applied, an effective content thereof is usually 10 to 10,000 g per hectare, and preferably 25 to 5,000 g per hectare. In a case where such composition is applied by being diluted with water, the dilution ratio is usually 5 to 50,000 times, preferably 10 to 20,000 times, and more preferably 15 to 10,000 times.

Examples of methods of applying the insecticidal composition include spraying treatment on plant stems and leaves, spraying treatment on a soil surface, injection treatment into a soil, soil irrigation treatment, and spraying treatment on a water surface.

Specific examples of the plant include rice, wheat, barley, corn, grape, apple, pear, peach, cherry, persimmon, citrus, soybean, common bean, strawberry, potato, cabbage, lettuce, tomato, cucumber, eggplant, watermelon, sugar beet, spinach, podded pea, pumpkin, sugarcane, tobacco, bell pepper, sweet potato, taro, konjac, rapeseed, cotton, sunflower, tulip, chrysanthemum, and turf grass, however, the plant is not limited thereto.

Examples of the harmful organism include Lepidoptera, Hemiptera, Diptera, Thysanoptera, and Coleoptera pests, which are target pests of the diamide-based insecticidal active ingredient.

A combination with other insecticidal active ingredients makes possible to control such target pests of diamide-based insecticidal active ingredient and the target pests of above-mentioned other insecticidal active ingredients at the same time, and furthermore, an addition of a fungicidal active ingredient thereto also makes possible to control the target diseases of the above-mentioned fungicidal active ingredients at the same time.

The embodiments of the present invention have been described, but these are examples of the present invention, and various configurations other than the above can be adopted as long as the effect of the present invention is not impaired.

EXAMPLES

Hereinafter, the insecticidal composition of the present invention will be specifically described with reference to examples and comparative examples, but the present invention is not limited thereto.

Example 1

1.0 part by weight of broflanilide, 2.5 parts by weight of a formalin condensate of polyoxyethylene (38) distyrylphenyl ether (SORPOL F-27, manufactured by Toho Chemical Industry Co., Ltd.), and 96.5 parts by weight of methyl 5-(dimethylamino)-2-methyl-5-oxopentanoate ($\varepsilon_r$=22.2/$E_T$(30)=48.3 kcal/mol, POLARCLEAN, manufactured by Solvay Nicca, Ltd.) were dissolved by stirring at room temperature so as to obtain an insecticidal composition of Example 1.

Example 2

1.0 part by weight of broflanilide, 2.5 parts by weight of a formalin condensate of polyoxyethylene (38) distyrylphenyl ether (SORPOL F-27, manufactured by Toho Chemical Industry Co., Ltd.), and 96.5 parts by weight of N-butylpyrrolidone ($\varepsilon_r$=23.4/$E_T$(30)=41.3 kcal/mol, Genagen NBP, manufactured by Clariant International Ltd) were dissolved by stirring at room temperature so as to obtain an insecticidal composition of Example 2.

Example 3

1.0 part by weight of broflanilide, 2.5 parts by weight of a formalin condensate of polyoxyethylene (38) distyrylphenyl ether (SORPOL F-27, manufactured by Toho Chemical Industry Co., Ltd.), and 96.5 parts by weight of 1,3-dimethyl-2-imidazolidinone ($\varepsilon_r$=37.6/$\varepsilon_T$(30)=42.5 kcal/mol, DMI, manufactured by Mitsui Chemicals, Inc.) were dissolved by stirring at room temperature so as to obtain an insecticidal composition of Example 3.

Example 4

1.0 part by weight of broflanilide, 2.5 parts by weight of a formalin condensate of polyoxyethylene (38) distyrylphenyl ether (SORPOL F-27, manufactured by Toho Chemical Industry Co., Ltd.), and 96.5 parts by weight of 3-methyl-2-oxazolidone ($\varepsilon_r$=77.5/$E_T$ (30)=46.0 kcal/mol, Texnol MOZ, manufactured by Nippon Nyukazai Co., Ltd.) were dissolved by stirring at room temperature so as to obtain an insecticidal composition of Example 4.

Example 5

1.0 part by weight of broflanilide, 2.5 parts by weight of a formalin condensate of polyoxyethylene (38) distyrylphenyl ether (SORPOL F-27, manufactured by Toho Chemical Industry Co., Ltd.), and 96.5 parts by weight of N-methylpyrrolidone ($\varepsilon_r$=32.0/$E_T$(30)=42.2 kcal/mol, NMP, manufactured by LyondellBasell Industries N.V.) were dissolved by stirring at room temperature so as to obtain an insecticidal composition of Example 5.

Example 6

1.0 part by weight of broflanilide, 2.5 parts by weight of a formalin condensate of polyoxyethylene (38) distyrylphenyl ether (SORPOL F-27, manufactured by Toho Chemical Industry Co., Ltd.), and 96.5 parts by weight of 3-methoxy-N,N-dimethylpropanamide ($\varepsilon_r$=19.6/$E_T$(30)=41.7 kcal/mol, KJCMPA-100 (registered trademark), manufactured by KJ Chemicals Corporation) were dissolved by stirring at room temperature so as to obtain an insecticidal composition of Example 6.

Example 7

10.0 parts by weight of broflanilide, 2.5 parts by weight of a formalin condensate of polyoxyethylene (38) distyrylphenyl ether (SORPOL F-27, manufactured by Toho Chemical Industry Co., Ltd.), and 87.5 parts by weight of methyl 5-(dimethylamino)-2-methyl-5-oxopentanoate ($\varepsilon_r$=22.2/$E_T$(30)=48.3 kcal/mol, POLARCLEAN, manufactured by Solvay Nicca, Ltd.) were dissolved by stirring at room temperature so as to obtain an insecticidal composition of Example 7.

Example 8

10.0 parts by weight of broflanilide, 2.5 parts by weight of a formalin condensate of polyoxyethylene (38) distyrylphenyl ether (SORPOL F-27, manufactured by Toho Chemical Industry Co., Ltd.), and 87.5 parts by weight of N-butylpyrrolidone ($\varepsilon_r$=23.4/$E_T$(30)=41.3 kcal/mol, Genagen NBP, manufactured by Clariant International Ltd) were dissolved by stirring at room temperature so as to obtain an insecticidal composition of Example 8.

Example 9

10.0 parts by weight of broflanilide, 2.5 parts by weight of a formalin condensate of polyoxyethylene (38) distyrylphenyl ether (SORPOL F-27, manufactured by Toho Chemical Industry Co., Ltd.), and 87.5 parts by weight of 1,3-dimethyl-2-imidazolidinone ($\varepsilon_r$=37.6/$E_T$(30)=42.5 kcal/mol, DMI, manufactured by Mitsui Chemicals, Inc.) were dissolved by stirring at room temperature so as to obtain an insecticidal composition of Example 9.

Example 10

10.0 parts by weight of broflanilide, 2.5 parts by weight of polyoxyalkylene allylphenyl ether (Newkalgen CP-120, manufactured by Takemoto Oil & Fat Co., Ltd.), and 87.5 parts by weight of methyl 5-(dimethylamino)-2-methyl-5-oxopentanoate ($\varepsilon_r$=22.2/$E_T$(30)=48.3 kcal/mol, POLARCLEAN, manufactured by Solvay Nicca, Ltd.) were dissolved by stirring at room temperature so as to obtain an insecticidal composition of Example 10.

Example 11

20.0 parts by weight of broflanilide, 2.5 parts by weight of a formalin condensate of polyoxyethylene (38) distyrylphenyl ether (SORPOL F-27, manufactured by Toho Chemical Industry Co., Ltd.), and 77.5 parts by weight of N-butylpyrrolidone ($\varepsilon_r$=23.4/$\varepsilon_T$(30)=41.3 kcal/mol, Genagen NBP, manufactured by Clariant International Ltd) were dissolved by stirring at room temperature so as to obtain an insecticidal composition of Example 11.

Example 12

10.0 parts by weight of broflanilide, 2.5 parts by weight of a formalin condensate of polyoxyethylene (38) distyrylphenyl ether (SORPOL F-27, manufactured by Toho Chemical Industry Co., Ltd.), 86.5 parts by weight of methyl 5-(dimethylamino)-2-methyl-5-oxopentanoate ($\varepsilon_r$=22.2/$E_T$(30)=48.3 kcal/mol, POLARCLEAN, manufactured by Solvay Nicca, Ltd.), and 1.0 part by weight of xylene ($\varepsilon_r$=2.266 to 2.374/$E_T$(30)=33.1 kcal/mol, manufactured by Mitsui & Co., Ltd.) were dissolved by stirring at room temperature so as to obtain an insecticidal composition of Example 12.

Comparative Example 1

1.0 part by weight of broflanilide, 2.5 parts by weight of a formalin condensate of polyoxyethylene (38) distyrylphenyl ether (SORPOL F-27, manufactured by Toho Chemical Industry Co., Ltd.), and 96.5 parts by weight of tetrahydrofuran ($\varepsilon_r$=7.5/$E_T$(30)=37.4 kcal/mol, THF, manufactured by Tokyo Chemical Industry Co., Ltd.) were dissolved by stirring at room temperature so as to obtain an insecticidal composition of Comparative Example 1.

Comparative Example 2

1.0 part by weight of broflanilide, 2.5 parts by weight of a formalin condensate of polyoxyethylene (38) distyrylphenyl ether (SORPOL F-27, manufactured by Toho Chemical Industry Co., Ltd.), and 96.5 parts by weight of diethyl ether ($\varepsilon_r$=3.0/$E_T$(30)=48.6 kcal/mol, manufactured by Tokyo Chemical Industry Co., Ltd.) were dissolved by stirring at room temperature so as to obtain an insecticidal composition of Comparative Example 2.

Comparative Example 3

1.0 part by weight of broflanilide, 2.5 parts by weight of dioctyl sodium sulfosuccinate (Newkalgen EP-70G, manufactured by Takemoto Oil & Fat Co., Ltd.), and 96.5 parts by weight of methyl 5-(dimethylamino)-2-methyl-5-oxopentanoate ($\varepsilon_r$=22.2/$E_T$(30)=48.3 kcal/mol, POLARCLEAN, manufactured by Solvay Nicca, Ltd.) were dissolved by stirring at room temperature so as to obtain an insecticidal composition of Comparative Example 3.

Comparative Example 4

10.0 parts by weight of broflanilide, 2.5 parts by weight of a formalin condensate of polyoxyethylene (38) distyrylphenyl ether (SORPOL F-27, manufactured by Toho Chemical Industry Co., Ltd.), 57.5 parts by weight of methyl 5-(dimethylamino)-2-methyl-5-oxopentanoate ($\varepsilon_r$=22.2/$E_T$(30)=48.3 kcal/mol, POLARCLEAN, manufactured by Solvay Nicca, Ltd.), and 30.0 parts by weight of xylene ($\varepsilon_r$=2.266 to 2.374/$E_T$(30)=33.1 kcal/mol, manufactured by Mitsui & Co., Ltd.) were dissolved by stirring at 60° C. so as to obtain an insecticidal composition of Comparative Example 4.

Reference Example 0.5 parts by weight of broflanilide, 5.0 parts by weight of F-69, 5.0 parts by weight of 3-iodo-2-propynyl N-butylcarbamate, 23.0 parts by weight of benzyl alcohol ($\varepsilon_r$=13.1/$E_T$(30)=50.4 kcal/mol, manufactured by Tokyo Chemical Industry Co., Ltd.), 23.0 parts by weight of Solfit ($E_T$(30)=49.0 kcal/mol, manufactured by Kuraray Co., Ltd.), 38.5 parts by weight of dibutyl diglycol ($E_T$(30)=36.7 kcal/mol, DBDG, manufactured by Nippon Nyukazai Co., Ltd.), and 5.0 parts by weight of a mixture of an alkylbenzene sulfonate salt, polyoxyethylene tristyrylphenyl ether, and polyoxyethylene castor oil ether (Sanimal ALN-2, manufactured by Nippon Nyukazai Co., Ltd.) were dissolved by stirring at 60° C. so as to obtain an insecticidal composition of Reference Example.

In order to exhibit the usefulness of the insecticidal composition of the present invention, the following tests, namely, Test Example 1 (control effect test), Test Example 2 (emulsification stability test), and Test example 3 (preservation stability test) were carried out.

[Test Example 1] Control Effect Test on *Thrips palmi*

Ten hatched larvae of *Thrips palmi* (susceptible strain) were inoculated on a leaf disc (diameter of 20 mm) cut from a cucumber and sprayed with 7 mL of liquid chemical in a rotary distributing sprayer. A used liquid chemical was prepared by diluting the insecticidal composition obtained in examples and comparative examples with water and adjusting the concentration of an effective ingredient to 0.3 ppm. Mortality was calculated from the following expression by observing after two days. The test was performed in two places.

Mortality (%)={number of dead larvae/(number of dead larvae+number of survived larvae)}×100

Criteria of evaluation are A: mortality (%)=80% or more, and B: mortality (%)=less than 80%. The results are shown in Table 1.

TABLE 1

| Insecticidal composition | Evaluation of biological effectiveness | |
|---|---|---|
| | Evaluation | Mortality |
| Example 1 | A | 95% |
| Example 2 | A | 95% |
| Example 3 | A | 100% |
| Example 4 | A | 85% |
| Example 5 | A | 85% |
| Example 6 | A | 90% |
| Example 7 | A | 90% |
| Example 11 | A | 95% |
| Example 12 | A | 85% |
| Comparative Example 1 | B | 65% |
| Comparative Example 2 | B | 70% |
| Comparative Example 3 | B | 60% |
| Comparative Example 4 | B | 0% |

[Test Example 2] Emulsification Stability Test 0.1 mL of insecticidal compositions obtained in the examples and the comparative examples were respectively added into 100 mL of water having hardness of 3 degrees put in a 100 mL graduated cylinder, and the resultant dilutes were uniformly emulsified by inverting the graduated cylinder. After standing the diluted solution at 25° C. for two hours, the evaluation according to the following criteria was executed by visually observing the appearance.

Criteria of evaluation are A: uniform emulsification, and B: separation by creaming or crystal precipitation. The results are shown in Table 2.

TABLE 2

| Insecticidal composition | Evaluation of emulsification stability |
|---|---|
| Example 1 | A |
| Example 2 | A |
| Example 7 | A |
| Example 8 | A |
| Example 9 | A |
| Example 10 | A |
| Example 11 | A |
| Comparative Example 3 | B |

[Test Example 3] Preservation Stability Test

An extremely small amount of broflanilide was added, as a seed crystal, into 50 mL of the insecticidal composition obtained in examples and comparative examples, put in a 50 mL sample bottle. After standing the composition at −15° C. for 72 hours, the appearance was visually observed.

Criteria of evaluation are A: no change, and B: crystal precipitation. The results are shown in Table 3.

TABLE 3

| Insecticidal composition | Evaluation of preservation stability |
|---|---|
| Example 1 | A |
| Example 2 | A |
| Example 7 | A |
| Example 8 | A |
| Example 12 | A |
| Comparative Example 4 | B |

The insecticidal composition of the present invention is excellent in the preservation stability, the emulsification stability, and the harmful organism control effect. Furthermore, the composition has little anxiety about inhalation toxicity, a risk of fire, and air pollution because it does not contain the nonpolar solvent such as aromatic hydrocarbon (xylene or the like) as a main agent, so as to be useful.

This application claims priority on the basis of Japanese Patent Application No. 2018-214095 filed on Nov. 14, 2018, and incorporates the entire contents of such disclosure.

The invention claimed is:

1. An insecticidal composition comprising:
   (1) a diamide-based insecticidal active ingredient;
   (2) a solvent having 5 or more of a relative dielectric constant ($\varepsilon_r$) and 38 kcal/mol or more of a transition energy ($\varepsilon_T (30)$);
   (3) a nonionic surfactant; and
   (4) a nonpolar solvent that is contained in an amount less than 30% by weight with respect to a total amount of the composition,
   wherein (2) the solvent is one or more selected from the group consisting of N,N'-dimethylpropylene urea, N-methylpyrrolidone, dimethylsulfoxide, 3-methoxy-N,N-dimethylpropanamide, N-butylpyrrolidone, cyclohexanone, 3-butoxy-N,N-dimethylpropanamide, methyl 5-(dimethylamino)-2-methyl-5-oxopentanoate, N,N-dimethyloctanamide, lactic acid dimethylamide, N,N-dimethyldecanamide, γ-butyrolactone, 3-methyl-2-oxazodone, ethylene glycol monomethyl ether, and benzyl alcohol.

2. The composition according to claim 1,
wherein (2) the solvent has 5 to 78 of the relative dielectric constant ($\varepsilon_r$), and 38 to 52 kcal/mol of the transition energy ($\varepsilon_T$ (30)).

3. The composition according to claim 1,
wherein (1) the diamide-based insecticidal active ingredient is broflanilide.

4. The composition according to claim 1,
wherein (3) the nonionic surfactant is a phenyl ether-based surfactant.

5. The composition according to claim 4,
wherein the phenyl ether-based surfactant is a formalin condensate of polyoxyalkylene styrylphenyl ether.

6. The composition according to claim 1,
wherein a content of (1) the diamide-based insecticidal active ingredient is 0.1% to 30% by weight with respect to the total amount of the composition.

7. The composition according to claim 1,
wherein the composition is in a liquid state.

8. A method of controlling a harmful organism, comprising:
applying the insecticidal composition according to claim 1 to a plant, a soil, or a water surface.

9. The composition according to claim 5, wherein the polyoxyalkylene styrylphenyl ether is polyoxyalkylene monostyrylphenyl ether, polyoxyalkylene distyrylphenyl ether, or polyoxyalkylene tristyrylphenyl ether.

* * * * *